(12) United States Patent
Voorhees

(10) Patent No.: US 10,941,345 B2
(45) Date of Patent: Mar. 9, 2021

(54) SYSTEMS AND METHODS FOR VALVE SEALING

(71) Applicant: DeltaValve, LLC, Sandy, UT (US)

(72) Inventor: Paul Brent Voorhees, Sandy, UT (US)

( * ) Notice: Subject to any disclaimer, the term of this patent is extended or adjusted under 35 U.S.C. 154(b) by 0 days.

(21) Appl. No.: 16/750,788

(22) Filed: Jan. 23, 2020

(65) Prior Publication Data

US 2020/0157431 A1    May 21, 2020

Related U.S. Application Data

(62) Division of application No. 16/189,498, filed on Nov. 13, 2018, now Pat. No. 10,676,673.

(51) Int. Cl.
| | |
|---|---|
| *C10B 25/16* | (2006.01) |
| *F16K 3/314* | (2006.01) |
| *F16K 3/312* | (2006.01) |
| *C10B 39/08* | (2006.01) |
| *F16K 3/20* | (2006.01) |
| *F16K 27/04* | (2006.01) |

(52) U.S. Cl.
CPC ............. *C10B 25/16* (2013.01); *C10B 39/08* (2013.01); *F16K 3/20* (2013.01); *F16K 3/312* (2013.01); *F16K 3/314* (2013.01); *F16K 27/044* (2013.01)

(58) Field of Classification Search
CPC ......... C10B 25/16; C10B 39/08; C10B 25/10; F16K 27/044; F16K 3/20; F16K 3/314; F16K 3/312; F16K 3/0227
USPC ...................... 251/326–329, 284, 335.3, 174
See application file for complete search history.

(56) References Cited

U.S. PATENT DOCUMENTS

| | | | | | |
|---|---|---|---|---|---|
| 2,370,751 | A | ‡ | 3/1945 | Prager ..................... | F16K 3/207 251/159 |
| 3,040,773 | A | * | 6/1962 | McInerney ............. | F16K 49/00 137/556.3 |
| 3,145,969 | A | ‡ | 8/1964 | Von Zweck ............ | F16K 3/207 251/172 |
| 3,266,525 | A | * | 8/1966 | Heinz ...................... | F16K 3/207 138/94.3 |
| 3,524,467 | A | ‡ | 8/1970 | Worley .................. | F16K 3/188 137/340 |
| 3,576,198 | A | ‡ | 4/1971 | Bessot .................... | F16K 3/188 137/375 |
| 4,062,515 | A | * | 12/1977 | Bobo ........................ | F16K 3/10 251/167 |
| 4,157,169 | A | ‡ | 6/1979 | Norman .................. | F16K 51/02 251/167 |
| 4,278,236 | A | ‡ | 7/1981 | Janich ..................... | F16K 3/207 251/159 |
| 4,415,139 | A | ‡ | 11/1983 | Potts ..................... | F16K 3/0254 251/159 |
| 4,513,947 | A | ‡ | 4/1985 | Amend ..................... | F16K 3/20 251/159 |
| 4,562,992 | A | ‡ | 1/1986 | Sugisaki ................ | F16K 3/207 251/159 |

(Continued)

*Primary Examiner* — John Bastianelli
(74) *Attorney, Agent, or Firm* — Michael F. Krieger; Kirton McConkie

(57) ABSTRACT

A system for sealing an unheading or isolation valve in a petroleum refining process. Some aspects relate to a bellows seal for preventing leakage of petroleum product and steam within the valve. Some aspects relate to a restrictor for restricting the motion of a dynamic seat relative to a seat base structure.

8 Claims, 6 Drawing Sheets

(56) References Cited

U.S. PATENT DOCUMENTS

| | | | | |
|---|---|---|---|---|
| 6,561,484 B2 * | 5/2003 | Nakagawa | .............. | F16K 3/188 |
| | | | | 251/175 |
| 6,854,708 B2 ‡ | 2/2005 | Contin | ...................... | F16K 3/18 |
| | | | | 251/167 |
| 6,863,256 B2 * | 3/2005 | Lucas | ........................ | F16K 3/06 |
| | | | | 251/159 |
| 2016/0281860 A1 * | 9/2016 | Travnicek | ............... | F16K 3/029 |

\* cited by examiner
‡ imported from a related application

SYSTEMS AND METHODS FOR VALVE SEALING

CROSS-REFERENCE TO RELATED APPLICATION

This application is a divisional application claiming priority to U.S. patent application Ser. No. 16/189,498, which was filed Nov. 13, 2018.

BACKGROUND OF THE INVENTION

1. Field of the Invention

The invention relates generally to methods and systems for valve sealing.

2. Background and Related Art

Petroleum refining operations in which crude oil is processed frequently produce residual oils that have very little value. The value of residual oils can be increased using a process known as delayed coking. Residual oils, when processed in a delayed coker, are heated in a furnace to a temperature sufficient to cause destructive distillation in which a substantial portion of the residual oil is converted, or "cracked" into usable hydrocarbon products and the remainder yields a residual petroleum by-product which is pumped into a large vessel known as a coke drum.

The production of coke is a batch process. Each delayed coker unit usually contains more than one coke drum. In delayed coking, the feed material is typical residuum from vacuum distillation towers and frequently includes other heavy oils. The feed is heated as it is sent to one of the coke drums. The feed arrives at a coke drum with a temperature ranging from 870 to 910 degrees Fahrenheit. Typical drum overhead pressure ranges from 15 to 35 PSIG. Coker feedstock is deposited as a hot liquid slurry in a coke drum. Under these conditions cracking proceeds and lighter fractions produced flow out of the top of the coke drum and are sent to a fractionation tower where they are separated into vaporous and liquid products. A solid residuum called coke is also produced and remains within the drum. When a coke drum is filled, residual oil from the furnace is diverted to another coke drum. When a coke drum is filled to the desired capacity, and after feed-stock is diverted to another drum, steam is typically introduced into the drum to strip hydrocarbon vapors off of the solid material. The material as remaining is the coke drum cools and is quenched. Solid coke forms as the drum cools and must be removed from the drum so that the drum can be reused. While coke is being cooled in one drum and while the cooled solid coke is being extracted from that drum, a second drum is employed to receive the continuous production of coke feedstock as part of the delayed coker process. The use of multiple coke drums enables the refinery to operate the furnace and fractionating tower continuously. Drum switching frequently ranges from 10 to 24 hours.

In typical coking operations dramatic heat variances are experienced by elements in the coking operation. For example, a coke drum is filled with incoming by-product at about 900 degrees Fahrenheit and subsequently cooled after being quenched to nearly ambient temperatures. Not surprising, this repetitive thermal cycling may create or cause significant problems including stark heat distribution variance throughout various components of the valve system. The heated residual by-product utilized in coking operations comes into contact with not only the coke drum, but valve and seat components. This heating and subsequent cooling may result in expansion of various elements within a valve system. As previously mentioned, the delayed coking process typically comprises at least two vessels so that while one is being filled the other is being purged of material and prepared to receive another batch of by-product. Thus, during the off cycle, when a vessel is being purged of its contents, it will cool and return to a state of equilibrium. It is this cyclical pattern of dispensing hot residual by-product into a cooler coke drum and subsequently cooling the by-product that leads to thermal differential and stress within the coke drum, a valve, the valve parts and piping. It is the cyclical loading and unloading and stressing and destressing of a coke drum, valve or piping that is referred to as thermal cycling. Thermal cycling typically results in weakening or fatiguing of a coke drum, a valve and its parts which may lead to a reduction in the useful life of components. Uneven heat distributions or thermal variants existing between various components of the seat system can result in decreased longevity of the valve components and the valve body.

Also, because coke is formed using pressure, the deheading valve must form a seal to allow the pressure to build within the coke drum. This seal is generally formed using tight tolerances between the components of the deheading valve such as between the seats and the blind. These tight tolerances, however, increase the force required to slide the blind between the seats to open and close the valve. Also, due to this pressure, it is common to pressurize the internal compartments of the deheading valve such as by providing steam to the internal compartments. If a deheading valve does not provide a good seal, large amounts of steam will escape, which increases the total amount of steam required for production. In many cases, the cost of supplying steam to pressurize the valve can be significant. Accordingly, valves that prevent excessive steam leakage provide additional economy to the system.

In addition to decoking unheading applications, other petroleum refining applications can utilize similar valve technology. For example, isolation valves are commonly used to control the flow of hydrocarbon products. These applications comprise decoking valves, bypass valves, transfer line valves and other applications. These applications may also require steam pressure in the valve body to offset the line pressure and prevent flow of hydrocarbon products into the valve. These valves can also benefit from a superior seal to prevent steam losses and unnecessary valve maintenance.

BRIEF SUMMARY OF THE INVENTION

The present invention relates to valve systems for petroleum product piping and decoking unheading valve applications. The present invention relates, in particular, to sealing and retention systems for preventing steam losses while maintaining a proper seal to prevent product leakage.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

A description of embodiments of the present invention will now be given. It is expected that the present invention may take many other forms and shapes, hence the following disclosure is intended to be illustrative and not limiting, and the scope of the invention should be determined by reference to the appended claims and their equivalents.

Figure 1:
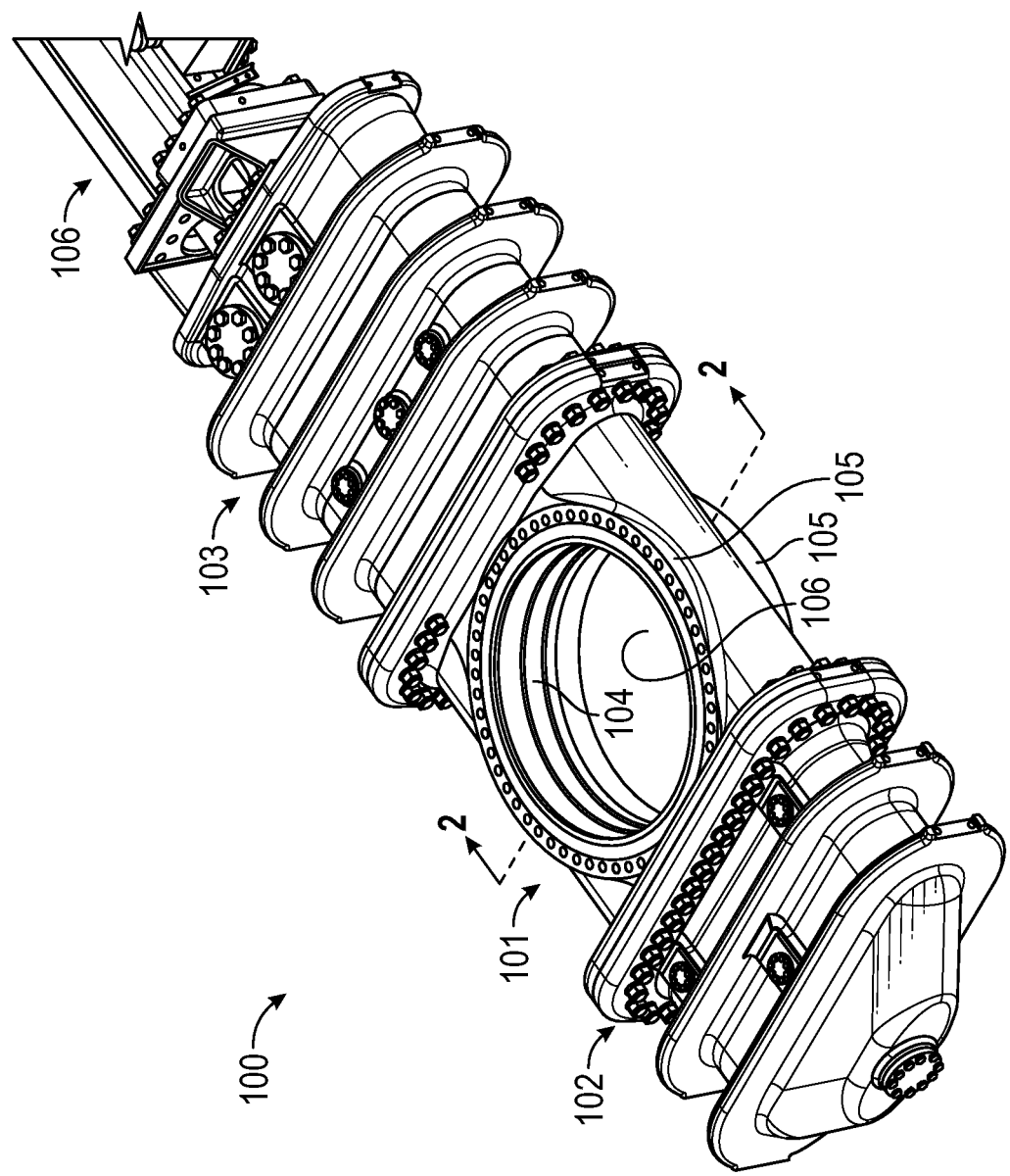
FIG. 1 shows the components of an exemplary valve, which may comprise elements of embodiments of the present invention.

Embodiments of the present invention may be utilized in several types of valves used in the petroleum refining industry. One exemplary type of valve is illustrated in FIG. 1. This is an exemplary unheading valve 100 typically used in a decoking process. This exemplary valve 100 comprises a main body 101 that is typically detachably affixed to an upper bonnet 103. Upper bonnet 103 provides a gas-tight or pressurizable compartment for receiving at least a portion of a blind 104 during operation. A lower bonnet 102 may also be detachably affixed to main body 101 and may also provide a gas-tight, pressurizable compartment for receiving at least a portion of blind 104. Main body 101 may comprise main line flanges 105 for attachment of main line piping for which flow may controlled by valve 100. Exemplary valve 100 may also comprise additional components 106 for actuating blind 104. During an actuation process for valve 100, blind 104 slides within main body 101 so as to permit or impede flow in a main line (not shown) attached to main line flanges 105. During this actuation, blind 104, or parts thereof, may enter and exit upper and lower bonnets 103, 102.

Figure 2:
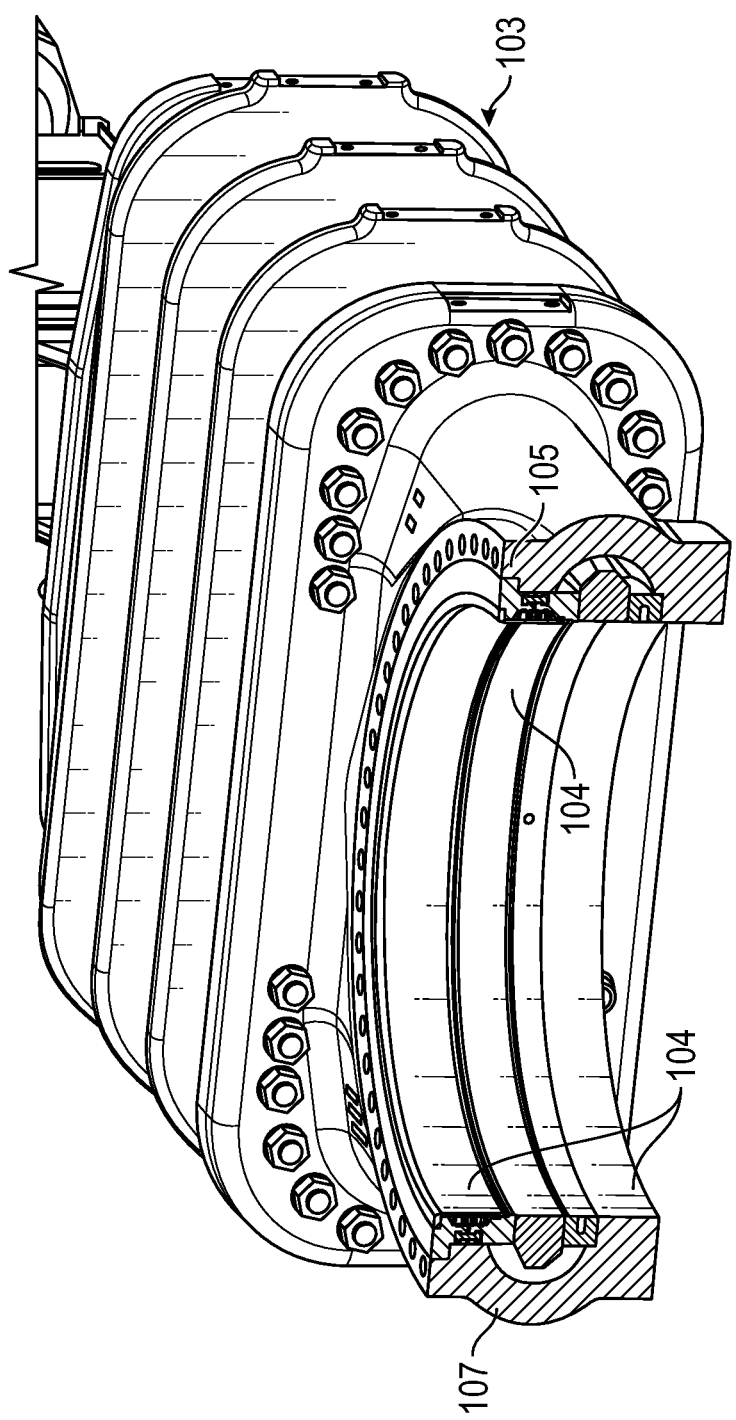
FIG. 2 shows a cross-sectional view of interior components of an unheading valve taken along lines A-A of FIG. 1.

FIG. 2 is a cross-sectional view taken along line A-A in FIG. 1.

A blind 104 is shown, which is typically a plate-like device with a hole or blind void space 106 therein. This exemplary valve 100 also has seat framework 104. During opening actuation, blind 104 slides so as to align the blind void space 106 with the corresponding holes or spaces in framework 107. This alignment of void spaces allows flow of liquids and gases in the attached piping, drums or other paraphernalia. This alignment is shown in the configuration of FIG. 2.

During a closing operation, blind 104 slides so as to align the solid plate area (retracted and not shown) with the holes or spaces in framework 107. This alignment of the solid plate area with the void spaces prevents the flow of liquids and gases in the attached piping, drums or other paraphernalia.

Figure 3:
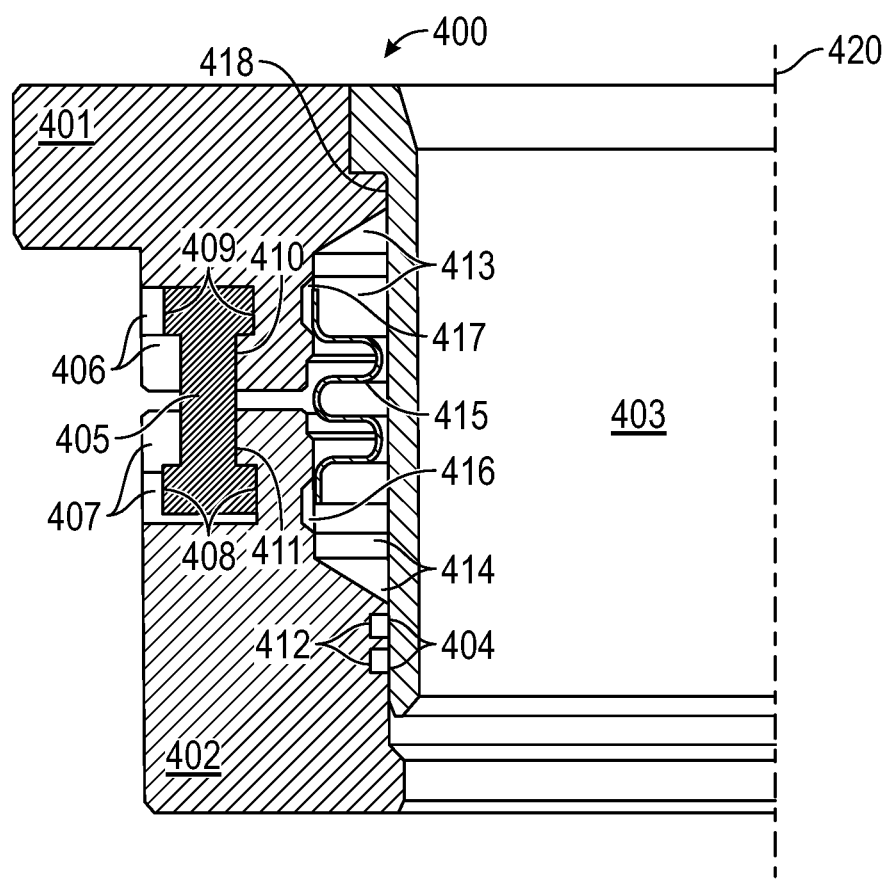
FIG. 3 is an enlarged section view of the seat assembly of an exemplary valve as shown in FIG. 2.

FIG. 3 illustrates an enlarged cross-sectional view of the circled area in FIG. 2 of an exemplary seat assembly 400, which may be used in a decoking unheading valve, an isolation valve or similar devices. This exemplary seat assembly 400 comprises a seat base structure 401 configured and shaped to engage a valve main body such as valve main body 301. In an exemplary embodiment, seat base structure 401 attaches to valve main body 301 with a static connection such that seat base structure 401 remains in a static, non-moving orientation relative to main body 301. Seat assembly 400 further comprises an interior liner 403 that may follow the contour of main line piping, a decoking drum or other attached component. Interior liner 403 is statically attached to seat base structure 401 such that they do not move relative to the valve main body during valve actuation. Interior liner 403 may be attached to seat base structure 401 with a pressed, friction fit or may simply be kept in its static position by a flange or other hardware that is bolted or otherwise attached adjacent to interior liner 403 forcing it against a shelf 418 in seat base structure 401.

Seat assembly 400 further comprises a dynamic seat 402 capable of vertical movement relative to seat base structure 401 and interior liner 403. Dynamic seat 402 may be vertically movably attached to seat base structure 401 through a series of structures and connections, which may include springs and restrictors. In an exemplary embodiment, dynamic seat 402 is biased away vertically from seat base structure 401 with an array of springs (as shown in FIG. 5) compressed between dynamic seat 402 and seat base structure 401. These springs may be compressed into recesses in dynamic seat 402 away from seat base structure 401. This bias or force, in an exemplary embodiment, may be directed in a direction parallel to a central axis 420 of a connected pipe or drum or perpendicular to the face of the valve blind (the vertical direction of FIG. 4).

Movement of dynamic seat 402 relative to seat base structure 401 may be limited or restricted vertically by a restrictor 405, which engages a base recess 406 in seat base structure 401 and a recess 407 in dynamic seat 402. Restrictor 405 may comprise one or more restrictor base flanges 409 and one or more restrictor seat flanges 408 which are shaped to engage base projection 410 and seat projection 411. Restrictors (Dowel pins) 600 minimize movement of dynamic seat 402 relative to seat base structure 401. Accordingly, in these embodiments, dynamic seat 402 is biased away from seat base structure 401 by compressed springs, and limiting the biasing of the spring's restrictor 405. Dowel pins 600 resist lateral forces from stroking the blind to keep dynamic seat 402 in place relative to seat base structure 401 when dynamic seat 402 is not in contact with a blind (not shown). However, when dynamic seat 402 is in contact with a blind and is compressed against seat base structure 401 beyond the limit of restrictor 405, dynamic seat 402 is allowed to flex with the contour of the blind it contacts thereby creating a tighter, more efficient seal.

Some embodiments of the present invention may comprise a seat bellows recess 414 and a base bellows recess 413. These recesses 413, 414 form a bellows chamber surrounded by seat base structure 401, dynamic seat 402 and interior liner 403. This chamber contains a bellows 415 that connects to seat base structure 401 and to dynamic seat 402 forming a flexible seal between these structures. In some embodiments, bellows 415 may be welded to seat base structure 401 and dynamic seat 402. In some embodiments, bellows 415 may be composed of a metal that cannot be directly welded to seat base structure 401 and/or dynamic seat 402 without special procedures. In this case, these embodiments may comprise a seat butter pass layer 416 and/or a base butter pass layer 417 where compatible metals may be welded or otherwise deposited to enable more efficient welding of the bellows 415 to the seat base structure 401 and/or the dynamic seat 402. When bellows 415 is attached to seat base structure 401 and dynamic seat 402, the dynamic seat 402 is allowed to move relative to the seat base structure 401 via flexure of the bellows 415. However, bellows 415 prevents the passage or escape of steam and other gases or fluids through the interface between the seat base structure 401 and the dynamic seat 402.

In a preferred embodiment, bellows 415 may be composed of Inconel alloy or stainless steel 317. In another embodiment, bellows 415 may be composed of a Monel alloy.

Figure 4:
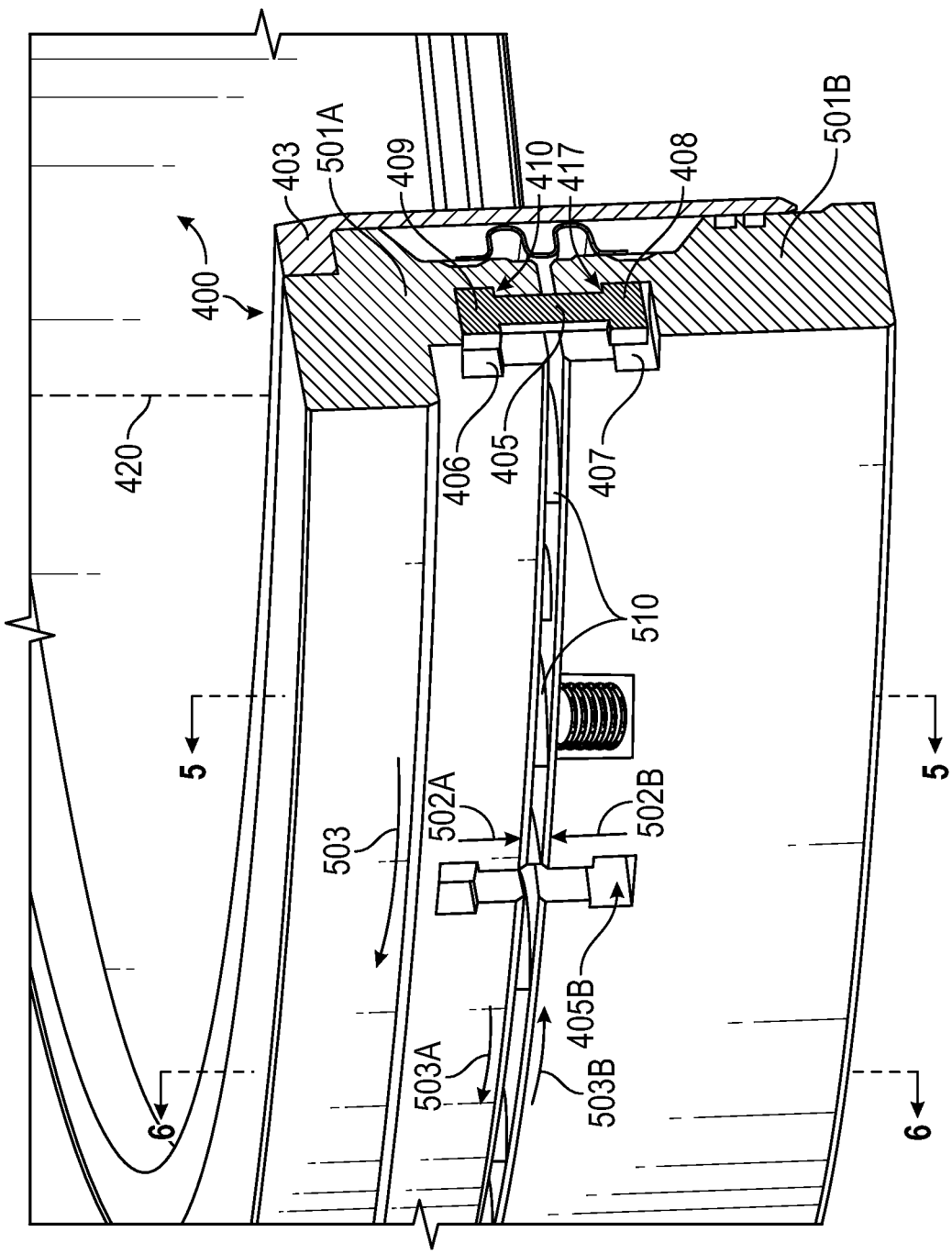
FIG. 4 shows a cross-section of an embodiment of the present invention comprising a vertical restrictor and bellows seal take along lines B-B of Figure A.
Figure 5:
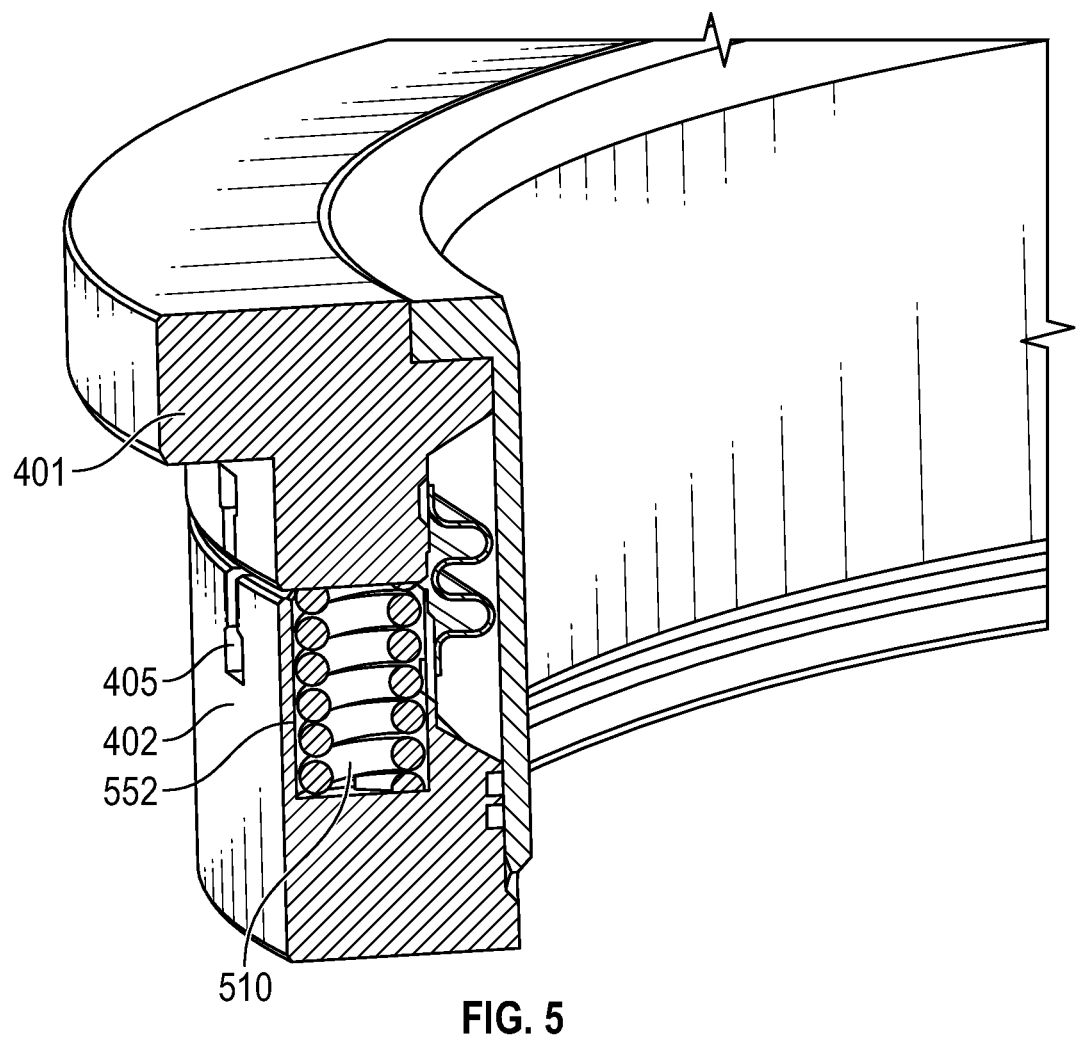
FIG. 5 shows a cross-section of an embodiment of the present invention comprising a vertical restrictor and bellows seal.

Some embodiments of the present invention may be described with further reference to FIG. 4. These embodiments comprise one or more packing glands 412 recessed into dynamic seat 402. These packing glands 412 may be fitted with packing material 404 to provide a sliding seal against leakage of gases and liquids from within the piping, drum or other vessel serviced by the valve. The use of packing glands 412 and packing material 404 allows interior liner 403 to remain static while dynamic seal 402 slides to accommodate variations in the blind plate while preventing the escape of fluids through the joint between them.

Some embodiments of the present invention may be described with reference to FIG. 4. FIG. 4 is a three dimensional cut-away section through seat assembly 400 of FIG. 3 at the position of a restrictor 405. From this view, it can be seen that one function of restrictor 405 is to prevent vertical movement of dynamic seat 402 away from seat base structure 401. Springs 510 may be compressed between seat base structure 401 and dynamic seat 402 to repel dynamic seat away from seat base structure 401. However, this movement induced by the spring forces must be restricted to avoid disassembly of the seat assembly 400 and unwanted movement of the dynamic seat 402. This may be affected by restrictors 405, which comprise restrictor flanges 408 & 409 that engage base projection 410 and seat projection 411 to limit or restrict movement of dynamic seat 402 away from seat base structure 401 in a direction parallel to axis 420 or perpendicular to seat face 419. This engagement prevents seat base structure 401 from moving in direction 501A and prevents dynamic seat 402 from moving in direction 501B.

Similarly, restrictor 405 may prevent movement in an opposite direction, which can be described with reference to FIG. 6. These embodiments, restrictor 405 has an inter-flange length 603, which is the distance between the inside of the restrictor flanges, and an overall length 601, which is the distance between the outside edges of the flanges. These distances can be set specifically to restrict motion of the dynamic seat 402 relative to the seat base structure 401. For example, inter-flange length 603 can be set to be more than the distance between the outer edges of seat projection 411 and base projection 410—distance 604. This difference in distances or lengths allows dynamic seat 402 to move to an outer limit away from seat base structure 401. Similarly, the overall length 601 of restrictor 405 may be set to a specific value relative to the sizes of seat recess 407 and base recess 406. This length relationship can limit the minimum distance between seat base structure 401 and dynamic seat 402. This limitation can prevent crushing of the springs 510, the bellows 415 and other seat assembly parts.

In some embodiments, restrictor 405 may also restrict movement in yet another direction. As shown in FIGS. 3 and 5, seat assembly 400 may have a circular ring shape about a central axis 420. In this configuration, seat base structure 401 may rotate about the axis 420 relative to the position of dynamic seat 402. This rotation is illustrated as directions 503A and 503B in FIG. 5. This relative rotation can bind springs and other valve parts and is often undesirable. Accordingly, this relative motion 503A, 503B can be restricted or prevented by close attention to the relative sizes of restrictor widths 605 & 607 with respect to recess widths 606 and 608. When these widths are set very close together, they can allow movement parallel to axis 420 while preventing rotational movement between the base structure 401 and dynamic seat 402. Accordingly, a properly dimensioned restrictor can restrict movement of the dynamic seat 402 relative to the seat base structure 401 in multiple directions thereby maintaining proper alignment and protecting parts from damage and wear.

FIG. 5 is a cross-sectional view taken along line B-B in FIG. 4.

A spring 510 is shown compressed in a spring pocket 552 so as to bias apart base structure 401 and dynamic seat 402a in opposition to retainer 405 which restricts the biasing force of the spring 510.

Figure 6:
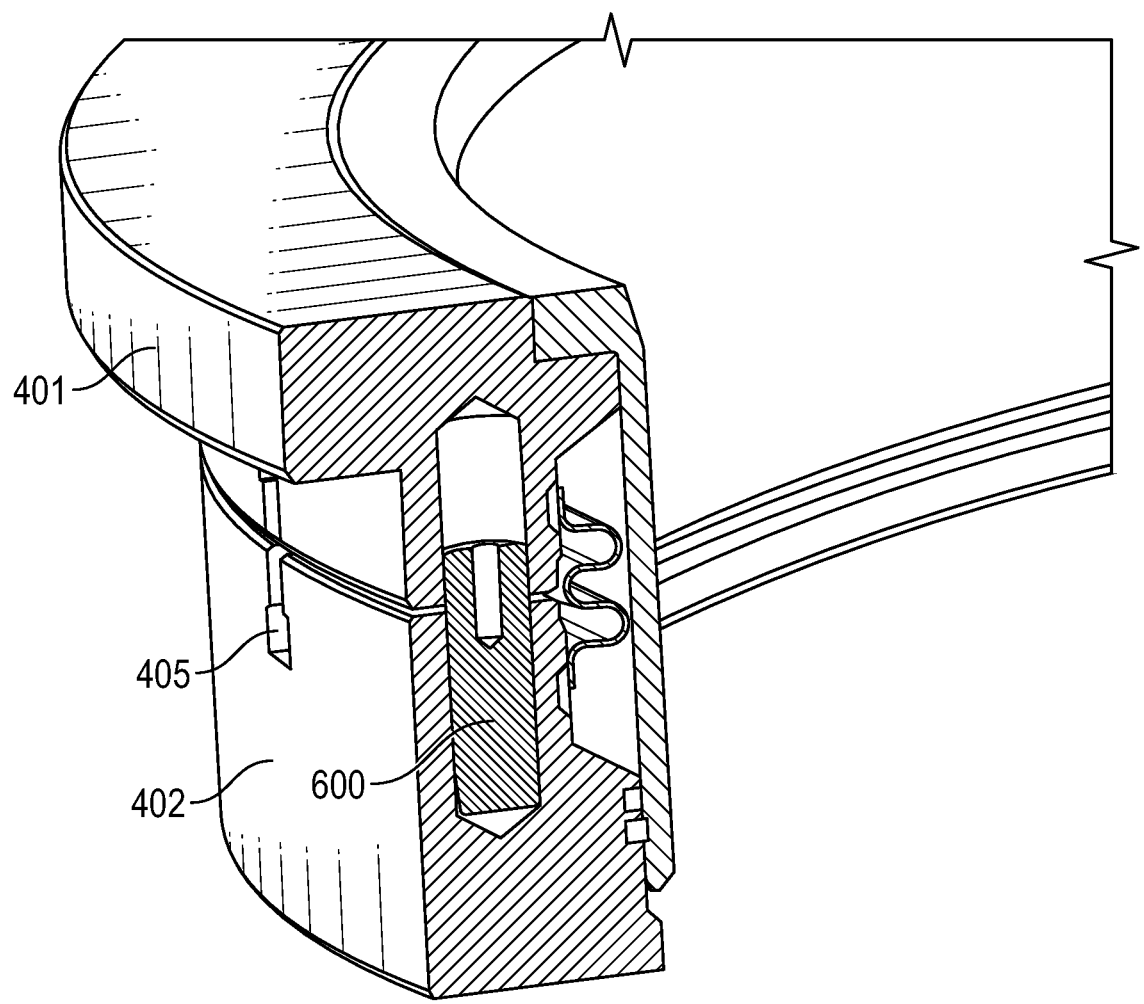
FIG. 6 shows a cross-section of an embodiment of the present invention comprising a vertical restrictor taken along lines C-C of FIG. 4.

FIG. 6 is an enlarged cross-sectional view taken along line C-C of FIG. 4. Dowel pin 600 is shown restricting the horizontal movement between seat base 401 and dynamic seat 402.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A valve sealing system for use in an unheading or isolation valve in a petroleum refining or chemical process, said sealing system comprising:
   a seat base structure fixably attached to a main body of said unheading or isolation valve;
   a dynamic seat movably attached to said seat base structure such that said dynamic seat can move with the contour of a valve blind;
   a restrictor for restricting the vertical movement of said dynamic seat relative to said seat base structure, wherein flanges on said restrictor engage base projections in said seat base structure and seat projections in said dynamic seat to restrict said movement.

2. The system of claim 1 wherein an overall length of said restrictor restricts movement of said dynamic seat toward said seat base structure to a maximum value.

3. The system of claim 1 wherein an inter-flange length of said restrictor positions restrictor flanges to restrict movement of said dynamic seat relative to said seat base structure to a maximum value.

4. The system of claim 1 wherein an inter-flange length of said restrictor positions restrictor flanges to restrict movement of said dynamic seat relative to said seat base structure to a maximum value and an overall length of said restrictor restricts movement of said dynamic seat toward said seat base structure to a maximum value.

5. The system of claim 1 wherein a width of said restrictor relative to a width of a recess in said seat base structure restricts rotation of said dynamic seat, about an axis, relative to said seat base structure to a maximum value.

6. The system of claim 1 further comprising a bellows seal, wherein an inter-flange length of said restrictor positions restrictor flanges to restrict movement of said dynamic seat relative to said seat base structure to a maximum elastic deformation value for a bellows seal.

7. The system of claim 1 further comprising a bellows seal, wherein an inter-flange length of said restrictor positions restrictor flanges to restrict the position of said dynamic seat relative to said seat base structure to a position where said bellows seal can be welded.

8. The system of claim 1, further comprising dowel pins to restrict the lateral movement of said dynamic seat relative to said seat base.

\* \* \* \* \*